US009840626B2

(12) United States Patent
Farrugia et al.

(10) Patent No.: US 9,840,626 B2
(45) Date of Patent: *Dec. 12, 2017

(54) ANTI-BACTERIAL AQUEOUS INK COMPOSITIONS COMPRISING METAL ION COMPOSITE IONOMER RESINS

(71) Applicant: Xerox Corporation, Norwalk, CT (US)

(72) Inventors: Valerie M. Farrugia, Oakville (CA); Wendy Chi, Toronto (CA)

(73) Assignee: Xerox Corporation, Norwalk, CT (US)

(*) Notice: Subject to any disclaimer, the term of this patent is extended or adjusted under 35 U.S.C. 154(b) by 10 days.

This patent is subject to a terminal disclaimer.

(21) Appl. No.: 14/807,127

(22) Filed: Jul. 23, 2015

(65) Prior Publication Data

US 2017/0022370 A1 Jan. 26, 2017

(51) Int. Cl.
| | |
|---|---|
| *B41J 2/015* | (2006.01) |
| *C09D 5/14* | (2006.01) |
| *C09D 125/14* | (2006.01) |
| *C09D 133/12* | (2006.01) |
| *C09D 11/30* | (2014.01) |

(Continued)

(52) U.S. Cl.
CPC ............... *C09D 5/14* (2013.01); *C08K 3/08* (2013.01); *C09D 11/106* (2013.01); *C09D 11/30* (2013.01); *C09D 11/322* (2013.01); *C09D 125/14* (2013.01); *C09D 133/12* (2013.01); *C08K 2003/0806* (2013.01)

(58) Field of Classification Search
None
See application file for complete search history.

(56) References Cited

U.S. PATENT DOCUMENTS

| 5,389,958 A | 2/1995 | Bui et al. |
| 6,210,474 B1 | 4/2001 | Romano et al. |

(Continued)

OTHER PUBLICATIONS

Lok et al., "Silver Nanoparticles: Partial Oxidation and Antibacterial Activities," J. Biol. Inorg. Chem., May 2007; 12 (4): 527-34, ePub Feb. 16, 2007, Abstract, 2 pages.

(Continued)

*Primary Examiner* — Erica Lin
(74) *Attorney, Agent, or Firm* — Marylou J. Lavoie, Esq. LLC

(57) ABSTRACT

An aqueous ink composition including water; an optional co-solvent; an optional colorant; and a composite nanoparticle comprising a core and a shell; wherein the core comprises a styrene/acrylate polymer core resin, optionally comprising a metal; and wherein the shell comprises a metal. An aqueous ink composition including water; an optional co-solvent; an optional colorant; and an ionic polymer-metal composite; wherein the ionic-polymer metal composite nanoparticle acts as a reservoir for the delivery of metal ions for anti-bacterial effect, antifungal effect, antiviral biocide effect, or a combination thereof. A process comprising incorporating an aqueous ink into an ink jet printing apparatus; ejecting droplets of ink in an imagewise pattern onto an intermediate transfer member or directly onto a final image receiving substrate; optionally, heating the image; and optionally, when an intermediate transfer member is used, transferring the ink in the imagewise pattern from the intermediate transfer member to a final substrate.

19 Claims, 1 Drawing Sheet

(51) Int. Cl.
*C08K 3/08* (2006.01)
*C09D 11/106* (2014.01)
*C09D 11/322* (2014.01)

(56) References Cited

U.S. PATENT DOCUMENTS

| | | | | |
|---|---|---|---|---|
| 7,312,011 | B2 | 12/2007 | Patel et al. | |
| 8,616,694 | B2 | 12/2013 | Kagata et al. | |
| 8,932,791 | B2* | 1/2015 | Chun | G03G 9/122 430/114 |
| 2005/0171235 | A1* | 8/2005 | Harren | A61L 15/24 523/122 |
| 2007/0281136 | A1* | 12/2007 | Hampden-Smith | B41M 1/22 428/195.1 |
| 2010/0084599 | A1* | 4/2010 | Lewis | B22F 1/0022 252/62.2 |
| 2011/0048772 | A1* | 3/2011 | Han | C09D 11/52 174/257 |
| 2011/0303885 | A1* | 12/2011 | Vanheusden | H01B 1/22 252/513 |
| 2011/0318551 | A1* | 12/2011 | Nakagawa | B01J 13/02 428/206 |
| 2013/0189499 | A1 | 7/2013 | Blanton et al. | |
| 2014/0204162 | A1 | 7/2014 | Keoshkerian et al. | |
| 2015/0079504 | A1* | 3/2015 | Farrugia | G03G 9/09392 430/18 |
| 2015/0116414 | A1 | 4/2015 | Eliyahu et al. | |

OTHER PUBLICATIONS

Rai et al., "Silver Nanoparticles as a New Generation of Antimicrobials," Biotechnol. Adv., Jan.-Feb. 2009; 27(1): 76-83, Epub Sep. 30, 2008, Abstract, 1 page.
Guggenbickler et al., "A New Technology of Microdispersed Silver in Polyurethane Induces Antimicrobial Activity in Central Venous Catheters," Infection, 1999; 27, Supp 1:S16-23, Abstract, 2 pages.
Klueh et al., "Efficacy of Silver Coated Fabric to Prevent Bacterial Colonization and Subsequent Device-Based Biofilm Formation," Journal of Biomedical Materials Research Part A, vol. 53, Issue 6, First Published Nov. 20, 2000, Abstract, 3 pages.
Davies et al., "The Development and Functions of Silver in Water Purification and Disease Control," Catalysis Today, vol. 36, Issue 1, Apr. 25, 1997, Abstract, 2 pages.
Valerie M. Farrugia, et al., U.S. Appl. No. 14/531,900, filed Nov. 1, 2014, "Metal Nanoparticle-Sulfonated Polyester Composites and Methods of Making the Same," not yet published.
Valerie M. Farrugia, et al., U.S. Appl. No. 14/706,048, filed May 7, 2015, "Antimicrobial Sulfonated Polyester Resin," not yet published.
Valerie M. Farrugia, et al., U.S. Appl. No. 14/706,037, filed May 7, 2015, "Antimicrobial Toner," not yet published.
Valerie M. Farrugia, et al., U.S. Appl. No. 14/706,027, filed May 7, 2015, "Metallo Ionomer Polymers," not yet published.
Valerie M. Farrugia, et al., U.S. Appl. No. 14/706,097, filed May 7, 2015, "Anti-Bacterial Aqueous Ink Compositions Comprising Self-Dispersed Sulfonated Polyester-Silver Nanoparticle Composites," not yet published.
Kavitha et al., "Nanosilver/hyperbranched polyester (HBPE): synthesis, characterization, and anti-bacterial activity," J. Coat. Technol. Res., Sep. 2013, vol. 10, Issue 5, pp. 669-670.
S. Mukherjee et al., Potential Theranostics Application of Bio-Synthesized Silver Nanoparticles (4-in-1 System), Theranotics, Jan. 29, 2014, pp. 316-335.
Tsavalas et al., "Grafting Mechanisms in Hybrid Miniemulsion Polymerization," Journal of Applied Polymer Science, vol. 87, pp. 1825-1836 (2003).
Adams et al., "Size-Dependent Antimicrobial Effects of Novel Palladium Nanoparticles," PLOS ONE, vol. 9, Issue 1, Jan. 2014.
Rashid et al., "Synthesis of Silver Nano Particles (Ag-NPs) and their uses for Quantitative Analysis of Vitamin C Tablets," J. Pharm. Sci., 12(1): 29-33, Jun. 2013.
Anitha Sironmani et al., "Silver Nanoparticles—Universal Multifunctional Nanoparticles for Bio Sensing, Imaging for Diagnostics and Targeted Drug Delivery for Therapeutic Applications, Drug Discovery and Development—Present and Future," Dr. Izet Kapetanovic (ed.), ISBN: 978-953-307-61507, InTech, Dec. 16, 2011.
Karanikas et al., "Preparation of novel ink-jet inks with antimicrobial and bacteriostatic properties to be used for digital printing of polyester and polyamide fibers," Progress in Organic Coatings, 76 (2013), pp. 1112-1118.
Yasuyuki et al., "Antibacterial properties of nine pure metals: a laboratory study using *Stapyloccus aureus* and *Escherichia coli*," Biofouling: The Journal of Bioadhesion and Biofilm Research, Oct. 2010; 26 (7): 851-8.
Song et al., Preparation, characterization, and antibacterial activity studies of silver loaded poly (styrene-co-acrylic acid) nanocomposites, Materials Science and Engineering C 36, 146-151, available online Dec. 7, 2013.
Kundu et al., Micelle bound redox dye marker for nanogram level arsenic detection promoted by nanoparticles, New J. Chem., 2002, 26, pp. 1081-1084.
Thurman et al., "The molecular mechanisms of copper and silver ion disinfection of bacteria Q2 and viruses," Critical Reviews in Environmental Control, vol. 18, Issue 4, 1989, 295-315.
Ghosh et al., "Silver and Gold Nanocluster Catalyzed Reduction of Methylene Blue by Arsine in a Micellar Medium," Langmuir, 2002, 18, 8756-8760.

* cited by examiner

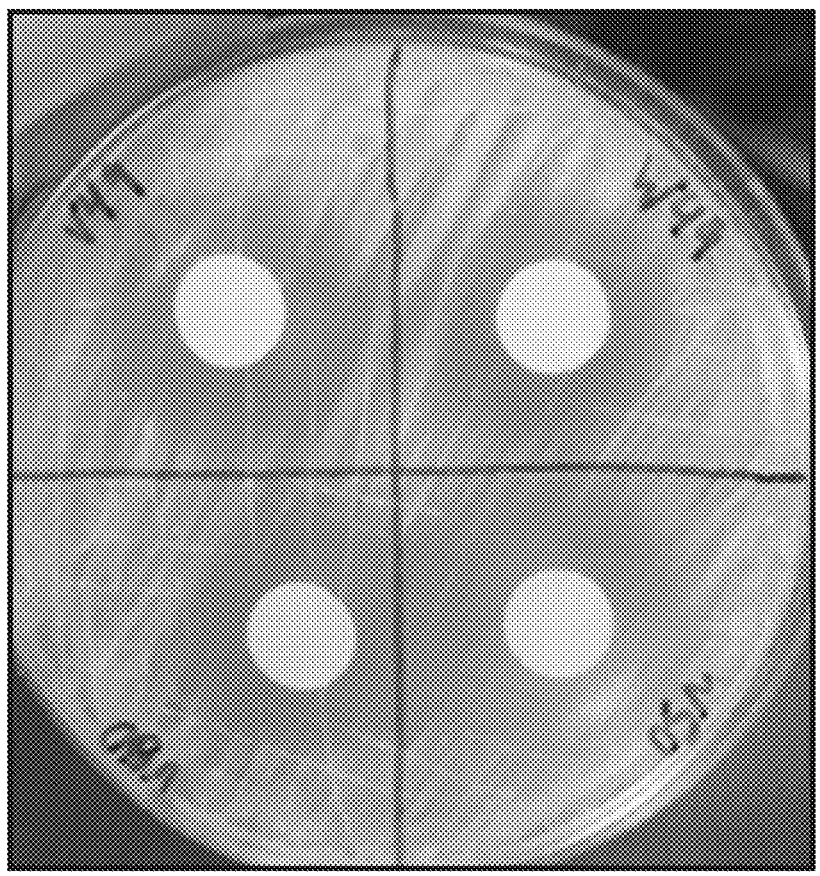

ANTI-BACTERIAL AQUEOUS INK COMPOSITIONS COMPRISING METAL ION COMPOSITE IONOMER RESINS

BACKGROUND

Disclosed herein is an aqueous ink composition comprising water; an optional co-solvent; an optional colorant; and an ionic polymer-metal composite; wherein the ionic-polymer metal composite nanoparticle acts as a reservoir for the delivery of metal ions for anti-bacterial effect, antifungal effect, antiviral biocide effect, or a combination thereof. Further disclosed herein is an aqueous ink composition comprising water; an optional co-solvent; an optional colorant; and a composite nanoparticle comprising a core and a shell; wherein the core comprises a styrene/acrylate polymer core resin, optionally comprising a metal; and wherein the shell comprises a metal.

There is a growing problem related to bacterial and fungal contamination through contact with surfaces and objects especially within hospitals, medical clinics, airplanes, and cruise ships, to mention a few. Individuals suffering from gastroenteritis, for example, can easily spread the illness by touching handrails, shared utensils, elevator buttons, etc. In some cases, contamination can be deadly especially in the cases of outbreaks of gastroenteritis acquired on cruise ships caused by Noroviruses or food poisoning due to particular strains of *Escherichia coli* and *Salmonella*. Another bacterium, *Staphylococcus aureus*, is a major culprit for many illnesses and skin irritations. There is a type of *Staphylococcus aureus* that is Methicillin-resistant (known as MRSA) which is resistant to the antibiotic methicillin and other drugs in this class.

The use of an organic biocide in materials such as polymers, inks toners, etc., for preventing microbial growth, is described, for example, in U.S. Pat. No. 6,210,474, which is hereby incorporated by reference herein in its entirety. However, anti-microbial effectiveness within a printed or coated state of a printed ink or toner has not been described or demonstrated. As well, many anti-microbially active compounds are not compatible with aqueous ink jet ink formulations or include using solvents such as dimethylsulfoxide. Also, some ink jet ink compositions contain silver or even gold particles to produce metallic glossy prints, but have not been described or demonstrated to possess anti-microbial effectiveness. See, for example, U.S. Pat. No. 8,616,694, which is hereby incorporated by reference herein in its entirety, which describes an ink jet recording method including an ink composition containing a glitter pigment.

U.S. Patent Application 20130189499, which is hereby incorporated by reference herein in its entirety, describes inks which include a mixture of solvent and a silver salt biocide including a silver sulfate biocide. Here, the clear or colored ink is applied in an imagewise fashion to a substrate, with fixing the clear or colored ink to the substrate whereby an effective coating or image article is formed that provides anti-bacterial and antifungal protection.

U.S. patent application Ser. No. 14/706,097, which is hereby incorporated by reference herein in its entirety, describes an aqueous ink composition including water; an optional co-solvent; an optional colorant; and a composite comprising a sulfonated polyester matrix having a plurality of silver nanoparticles dispersed within the matrix.

Currently available ink compositions may be suitable for their intended purposes. However a need remains for improved aqueous ink compositions. Further, a need remains for aqueous anti-bacterial ink compositions. Further, a need remains for aqueous anti-bacterial ink compositions having anti-microbial effectiveness within a printed or coated state of the printed ink. Further, a need remains for aqueous anti-bacterial ink compositions having anti-microbial effectiveness within a printed or coated state of the printed ink, that are environmentally friendly, and that do not require organic solvents.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is an aqueous ink composition comprising water; an optional co-solvent; an optional colorant; and a composite nanoparticle comprising a core and a shell; wherein the core comprises a styrene/acrylate polymer core resin, optionally comprising a metal; and wherein the shell comprises a metal.

Also described is a process comprising incorporating an aqueous ink comprising water; an optional co-solvent; an optional colorant; and a composite nanoparticle comprising a core and a shell; wherein the core comprises a styrene/acrylate polymer core resin, optionally comprising a metal; and wherein the shell comprises a metal, into an ink jet printing apparatus; ejecting droplets of ink in an imagewise pattern onto an intermediate transfer member or directly onto a final image receiving substrate; optionally, heating the image to partially or completely remove solvents; and optionally, when an intermediate transfer member is used, transferring the ink in the imagewise pattern from the intermediate transfer member to a final recording substrate.

Also described is an aqueous ink composition comprising water; an optional co-solvent; an optional colorant; and an ionic polymer-metal composite; wherein the ionic-polymer metal composite nanoparticle acts as a reservoir for the delivery of metal ions for anti-bacterial effect, antifungal effect, antiviral biocide effect, or a combination thereof.

BRIEF DESCRIPTION OF THE DRAWINGS

FIG. 1 is an illustration showing large zones of inhibition observed on substrates having disposed thereon anti-bacterial ink compositions of the present embodiments.

DETAILED DESCRIPTION

Aqueous ink compositions are provided comprising water; an optional co-solvent; an optional colorant; and an ionic polymer-metal composite; wherein the ionic-polymer metal composite nanoparticle acts as a reservoir for the delivery of metal ions for anti-bacterial effect, antifungal effect, antiviral biocide effect, or a combination thereof. Further provided are aqueous ink compositions comprising water; an optional co-solvent; an optional colorant; and a composite nanoparticle comprising a core and a shell; wherein the core comprises a styrene/acrylate polymer core resin, optionally comprising a metal; and wherein the shell comprises a metal. In embodiments, the shell comprises a resin.

In embodiments, the composite nanoparticle is prepared by free radical emulsion polymerization. In embodiments, emulsion polymerization technology is used to incorporate silver methacrylate into a polymer chain to provide added functionality to the end latex that can be used in the present anti-bacterial aqueous ink compositions as well as expanded applications. The latex can be used in inks and toners and can be extended to anti-microbial coatings, additives, finishes, etc., without limitation.

The anti-bacterial ink compositions are synthesized as water based ink jet inks. Therefore, the ink compositions are environmentally friendly as they do not require organic solvents. In embodiments, the anti-bacterial activity is the result of the silver methacrylate incorporated into the styrene/n-butyl acrylate latex which is in contrast to previous water based ink compositions that employ silver salt biocides, such as silver nitrate, silver chloride, silver bromide, silver iodide, silver iodate, silver bromate, silver sulfate, silver tungstate, or silver phosphate. See Karanikas, E. K., Nikolaidis, N. F., and Tsatsaroni, E. G., Preparation of novel ink-jet inks with anti-microbial and bacteriostatic properties to be used for digital printing of polyester and polyamide fibers, Progress in Organic Coatings, 76 (2013), pages 1112-1118.

The anti-bacterial aqueous ink compositions herein can be applied to indirect printing applications wherein the ink is first applied imagewise onto an intermediate receiving member such as a drum, belt, etc., using an ink jet print head. The ink wets and spreads on the intermediate receiving member to form a transient image. The transient image then undergoes a change in properties such as partial or complete drying, thermal or photo-curing, gelation, etc., and the resulting transient image is then transferred to the final image receiving substrate. The inks can be designed and optimized to be compatible with the different subsystems including jetting, transfer, etc., that enable high quality printing at high speed. The anti-bacterial aqueous ink compositions herein can also be applied to direct printing applications.

Ink jet printing is one of the fastest growing imaging technologies. Some advantages of ink jet printing compared to other printing methods is the simplicity, lower production costs, reduced effluent waste, and less water and energy consumption. Based on the growing need for high performing products, especially when related to health and hygiene, the present water based digital printing inks with anti-bacterial properties fill a market need and provide consumers with a robust, effective, and lasting anti-microbial protection on any printable surface. Some key environments that can benefit from printing with the present aqueous anti-bacterial inks include hospitals, daycare centers, care homes, schools, dental offices, doctor offices, hospitals (e.g., charts memos, pictures), other types of medical offices, veterinary practices, law offices and courts (e.g., legal documents), kitchens, and restaurants (e.g., menus). The present anti-bacterial aqueous ink compositions and images printed therewith render any product more hygienic, helping the product maintain a fresh appearance by reducing or avoiding altogether odor causing or staining microbes and also avoid degradation of any important identification tag, label, or drug identification number (DIN) by the microbes themselves. In embodiments, the anti-bacterial aqueous ink compositions comprise a silver composite nanoparticle. Silver exhibits anti-microbial activity against a broad range of micro-organisms. Silver is considered an ideal anti-microbial agent because it has a high effectiveness against a wide range of relevant microbes and is regarded as non-toxic, especially considering the low concentrations needed for effective decontamination.

The aqueous anti-bacterial inks herein can be used for any suitable or desired application. The inks are particularly suitable for anti-bacterial printing applications having the final goal of producing customizable, digitized anti-bacterial printed images, text, coatings, etc. Examples of applications include printing codes, labels, or logos on medical devices such as catheters, thermometers, and other medical devices, printing on menus, food packaging materials, cosmetic tools and products, etc.

The present aqueous ink compositions enable customizable digitally printed ID codes, short-run printable materials, printing on three-dimensional medical components such as catheters, cardiac stents, programmable pace makers, and any other desired three-dimensional substrate.

The sources of microorganisms can be bacterial, viral, or fungal. Microorganism contamination can come from typical handling of objects and papers, etc., from airborne microbes via sneezing and coughing, and other manner of spreading of infection from contaminated persons or contact with contaminated objects. Contact of these microbes with the present anti-bacterial aqueous ink compositions, including contact with a printed image or text prepared with the present anti-bacterial aqueous compositions, will inhibit the microbial growth and, in embodiments, destroy any possible colonization at the site of contact.

Polymer-Metal Composites/Composite Nanoparticles

In embodiments, the present aqueous ink compositions comprise water; an optional co-solvent; an optional colorant; and an ionic polymer-metal composite; wherein the ionic-polymer metal composite nanoparticle acts as a reservoir for the delivery of metal ions for anti-bacterial effect, antifungal effect, antiviral biocide effect, or a combination thereof. In certain embodiments, the composite nanoparticle comprises a core and a shell; wherein the core comprises a styrene/acrylate polymer core resin, optionally comprising a metal; and wherein the shell comprises a metal.

Any suitable or desired metal can be selected for embodiments herein provided that the metal imparts the desired anti-bacterial effect, antifungal effect, antiviral biocide effect, or combination thereof. While other metals can be used, only certain ones will have anti-bacterial properties. In embodiments, Co, Cu, Ni, Au and Pd can be used in a silver composite, wherein the Co, Cu, Ni, Au, Pd, or mixture or combination thereof can impart anti-bacterial and/or anti-microbial properties. See, for example, Yasuyuki M, Kunihiro K, Kurissery S, et al. Biofouling 2010 October; 26(7): 851-8) describing Co, Cu, Ni as well as Au (and Pd). In embodiments, Ag and Cu are selected. In other embodiments, composites including Pt, Al, Cr, In, and mixtures and combinations thereof, can be selected.

In embodiments, the silver nanoparticles may comprise solely elemental silver or may be a silver composite, including composites with other metals. Such metal-silver composite may include either or both of (i) one or more other metals and (ii) one or more non-metals. Suitable other metals include for example Al, Au, Pt, Pd, Cu, Co, Cr, In, and Ni, particularly the transition metals for example Au, Pt, Pd, Cu, Cr, Ni, and mixtures thereof. Exemplary metal composites are Au—Ag, Ag—Cu, Au—Ag—Cu, and Au—Ag—Pd. Suitable non-metals in the metal composite include for example Si, C, and Ge. The various components of the silver composite may be present in an amount ranging, for example, from about 0.01% to about 99.9% by weight, particularly from about 10% to about 90% by weight. In embodiments, the silver composite is a metal alloy composed of silver and one, two or more other metals, with silver comprising for example at least about 20% of the nanoparticles by weight, particularly greater than about 50% of the nanoparticles by weight. Unless otherwise noted, the weight percentages recited herein for the components of the silver-containing nanoparticles do not include stabilizer.

Those skilled in the art will appreciate that metals other than silver may be useful and can be prepared in accordance with the methods disclosed herein. Thus, for example, composites may be prepared with nanoparticles of copper, gold, palladium, or composites of such exemplary metals. See, for example, Adams C P, Walker K A, Obare S O, Docherty K M, PLoS One. 2014 Jan. 20; 9(1):e85981. doi: 10.1371/journal.pone.0085981, eCollection 2014, describing palladium as an anti-microbial.

In embodiments, the optional core metal, if present, is selected from the group consisting of silver, cobalt, copper, nickel, gold, palladium, and combinations thereof; and the shell metal is selected from the group consisting of silver, cobalt, copper, nickel, gold, palladium, and combinations thereof. In certain embodiments, the optional core metal, if present, is silver; and the shell metal is silver.

In embodiments, the composite nanoparticle shell comprises a resin, wherein the resin comprises a silver composite monomer selected from the group consisting of a silver acrylate monomer, a silver methacrylate monomer, and combinations thereof. In certain embodiments, the composite nanoparticle shell comprises a resin, wherein the resin comprises a silver composite monomer selected from the group consisting of a silver acrylate monomer, a silver methacrylate monomer, and combinations thereof; wherein the silver composite monomer is present in the shell resin in an amount of from about 0.01 percent to about 10 percent, or from about 0.05 percent to about 8 percent, or from about 0.05 to about 4 percent, by weight based on the total weight of the shell reins.

In embodiments, the composite nanoparticle shell comprises a resin, wherein the shell resin comprises a co-monomer selected from the group consisting of methyl methacrylate, butyl acrylate, diacrylate, cyclohexyl methacrylate, styrene, methacrylic acid, dimethylaminoethyl methacrylate, and combinations thereof.

In embodiments, the core resin comprises a silver composite monomer selected from the group consisting of a silver acrylate monomer, a silver methacrylate monomer, and combinations thereof.

In embodiments, the optional core metal, if present, and the shell metal comprise a composite comprising silver and one or more other metals; wherein the optional core metal, if present, and the shell metal comprise a composite comprising silver and one or more non-metals; or wherein the optional core metal, if present, and the shell metal comprise a composite comprising silver, one or more other metals, and one or more non-metals.

In embodiments, the composites may comprise further nanostructured materials, such as, without limitation, carbon nanotubes (CNTs, including single-walled, double-walled, and multi-walled), graphene sheet, nanoribbons, nano-anions, hollow nanoshell metals, nano-wires and the like. In embodiments, CNTs may be added in amounts that enhance electrical and thermal conductivity.

The anti-bacterial aqueous ink compositions herein can comprise any suitable or desired composite nanoparticle. In embodiments, composite nanoparticles are selected as described in U.S. patent application Ser. No. 14/706,027, which is hereby incorporated by reference herein in its entirety. In embodiments, the anti-bacterial aqueous ink compositions herein contain a composite nanoparticle comprising a core and a shell, wherein the core comprises a styrene/acrylate polymer core resin, optionally comprising a metal, and wherein the shell comprises a metal. The styrene/acrylate binder resin comprises at least one metal ion. In embodiments, the binder resin is an acrylate/styrene ionomer synthesized by polymerization of, at least one metal ion acrylate or methacrylate monomer. In embodiments, the binder resin is a composite nanoparticle comprising a core of styrene/acrylate polymer resin and a shell comprising the composite styrene/acrylate ionomer resin. In embodiments, a metal is reduced with the core, with the shell or both. In embodiments, binder resins are selected that are anti-microbial, comprise thermal and electrical conductivity or thermal stability, and find use in preparation and/or manufacture of a range of articles, such as, inks (aqueous and dry), toner, sensors (bio and chemical), antimicrobial coatings, paint, electrical components, composites for 3-dimensional printing, additives, finishes, solar cells, fuel cells etc.

The shell, may comprise a resin comprising a metal or a reduced metal, and may cover the entire surface of a core particle or portions thereof. Hence, a shell can encompass the entire exterior surface of a particle, thereby encapsulating a core particle or can be found, for example, at sites on the surface of a core, as isolated patches of varying size, islands and so on.

The metal ion composite monomer can comprise any suitable metal, metal composite or metal combination, and the like, provided that the metal, metal composite or metal combination imparts the desired anti-microbial property. In embodiments, the metal ion composite monomer is silver acrylate or silver methacrylate. Silver is known for antimicrobial properties, however, for silver to have any antimicrobial properties, generally, the silver must be ionized (Lok et al., J Biol Inorg Chem, 12:527-534, 2007; Rai et al., Biotech Adv, 27:76-83, 2009); non-ionized silver often is inert (Guggenbichler et al., Infec 27, Suppl 1:S16-23, 1999). It is thought silver atoms bind to thiol groups (—SH) in enzymes causing deactivation of the enzymes. Silver forms stable S—Ag bonds with thiol-containing compounds in the cell membrane that are involved in transmembrane energy generation and ion transport (Klueh et al., J Biomed Mater Res 53:621-631, 2000). It also is believed that silver can take part in catalytic oxidation reactions resulting in formation of disulfide bonds (R—S—S—R). Silver catalyzes reaction between oxygen molecules in the cell and hydrogen atoms of thiol groups: water is released as a product and two thiol groups become covalently bonded to one another through a disulfide bond (Davies & Etris, Catal Today 26:107-114, 1997). In addition, silver ions may interact with a cell destabilizing plasma membrane potential and reducing levels of intracellular adenosine triphosphate (ATP), resulting in cell death (Mukherjee et al., Theran 2014; 4(3):316-335).

Silver also is known for electrical and thermal conductivity properties. The electrical and thermal conductivity of silver is the highest of all metals.

In embodiments, silver acrylate and silver methacrylate monomers are formed by neutralization of acrylic acid or methyl acrylic acid with a source of silver ions, such as, a silver salt. In that instance, an aqueous solution of an acrylic acid or a methyl acrylic acid is prepared and an aqueous solution of a silver salt, such as silver nitrate, is added. Once the composite monomers are formed, the composites may be purified, such as by precipitation, and dried or prepared in an emulsion for further use. Other methods for obtaining silver acrylate monomers may be available and those reagents are available commercially, including, for example, silver methacrylate (CAS No. 16631-02-0) and silver acrylate (CAS No. 5651-26-3), from Gelest, Inc., PA.

In embodiments, a metal acrylate monomer is incorporated in a styrene/acrylate polymer via polymerization, that is, as a monomer that is covalently bound to another monomer to form the polymer backbone. In embodiments, a silver acrylate monomer is incorporated in a styrene/acrylate polymer via polymerization, that is, as a monomer that is covalently bound to another monomer to form the polymer backbone. In embodiments, the present composite ionomer is prepared by emulsion polymerization in a reactor, wherein an emulsion of at least one silver acrylate monomer, a styrene/acrylate co-monomer, an optional branching agent and an optional chain transfer agent is added to a heated aqueous solution of surfactant. After reaching equilibrium, a solution of initiator can be added to the heated reactor and polymerization proceeds until completed. Formation of the latex comprising the composite ionomers may be done in isolation, wherein the ionomers optionally may be washed/screened/dried for future use, or a latex may be prepared as a multistep synthesis/polymerization of a further resin-based material, such as, a composite nanoparticle, or for production of the present anti-bacterial aqueous ink compositions.

The present embodiments provide a practical and economical approach since the latex composition contains the non-halide silver salt or silver complex. Incorporation of silver monomers in an ionomer, such as, with emulsion polymerization, improves stabilization of the latex composite and also allows a controlled release of silver ions from the composite. In addition, the polymer backbone prevents the silver ions from aggregating since the silver ions essentially are bonded to and integrated in a polymer backbone and that enforces strict positioning of the silver ions along the polymer backbone for sensor or anti-microbial applications. The ionic polymer matrix provides a large active surface area of silver ions which can be spread strategically along the polymer backbone. For instance, the silver ions can be situated on the exterior shell of a core-shell nanoparticle for better exposure of metal ions to the environment.

In embodiments, composite core/shell nanoparticles are provided wherein the core can comprise a styrene/acrylate resin, optionally comprising a metal, and a shell comprises at least one composite styrene/acrylate—metal ion polymer resin, such as, the above described silver ionomers. A core may be prepared by polymerization, such as, emulsion polymerization, of acrylate and styrene monomers. A shell resin may be prepared, as described above, and then added to an emulsion of core particles to form a shell encapsulating the core resin particles. In embodiments, a shell resin is synthesized on core particles, wherein the appropriate shell monomers and an initiator are added to the core particles. In embodiments, a metal ion is reduced on a resin or on a core particle to form a shell thereover. In embodiments, metal can be reducing during formation of a core. In embodiments, a metal can be reduced on a core. In embodiments, metal can be reduced on a shell.

The composite nanoparticles can be prepared by any suitable or desired method. In embodiments, methods for preparing composite nanoparticles comprise forming core particles in an emulsion polymerization latex followed by polymerization of a shell resin on the surface of core particles, wherein a core can comprise a styrene/acrylate resin and a shell can comprise at least one composite styrene/acrylate—metal ion polymer resin. In embodiments, an emulsion of core monomers (styrene monomers, acrylate monomers, optional chain transfer agent, and optional branching agents) is added to a heated solution of aqueous surfactant followed by addition of an initiator. Core reactants are polymerized to form core styrene/acrylate particles, optionally comprising a metal. Shell resin may be polymerized on core particles by addition of shell monomers followed by addition of an initiator. Following addition of a shell layer partially covering or encapsulating core particles, composite nanoparticles optionally may be washed/screened/dried for future use, or a latex may be prepared as a multistep synthesis/polymerization of a further resin-based material, such as, for production of articles, such as, inks or toners. In embodiments, both core and shell comprise metal ion resins.

In embodiments, the anti-bacterial aqueous ink compositions herein comprise either or both: 1) composite ionomer comprising at least one metal ion acrylate monomer; and/or 2) composite core/shell nanoparticles wherein the cores comprise a styrene/acrylate resin, which can comprise a metal, and a shell comprises at least one composite styrene/acrylate—metal ion ionomer.

Table 1 illustrates two of the key monomers that can be selected for emulsion polymerization of ionic polymer-metal composites are silver acrylate and silver acrylate.

TABLE 1

| Name | Molecular Weight |
|---|---|
| Silver Acrylate $\quad$ $H_2C{=}\underset{H}{C}-\overset{O}{\underset{\|}{C}}-O^- \ Ag^+$ | 192.95 |
| Silver Methacrylate $\quad$ $H_2C{=}\underset{CH_3}{C}-\overset{O}{\underset{\|}{C}}-O^- \ Ag^+$ | 178.93 |

The interaction between ionic silver and carboxylate groups, which act as ionic crosslinks, will have an effect on the properties of the polymer matrix such as solubility in chemical solvents, glass transition temperature, molecular weight, and water sensitivity. Representations of ionic crosslinks between ionomer type polymers are shown in the schemes below.

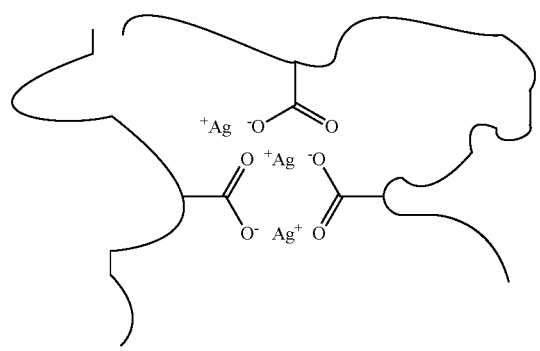

-continued

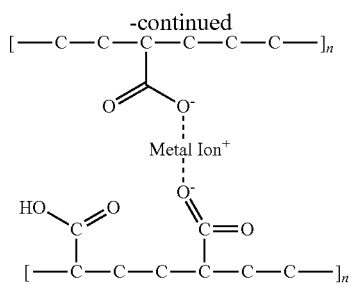

Definitions

As used herein, the modifier, "about," used in connection with a quantity is inclusive of the stated value and has the meaning dictated by the context (for example, it includes at least the degree of error associated with the measurement of the particular quantity). In embodiments, the terms of interest comprise a variation of less than about 10% from the stated value. When used in the context of a range, the modifier, "about," should also be considered as disclosing the range defined by the absolute values of the two endpoints. For example, the range "from about 2 to about 4" also discloses the range "from 2 to 4."

As used here, "metal acrylate(s)," such as, "silver acrylate(s)," is collective for acrylate monomers comprising at least one metal atom, such as, a silver atom, for use in polymers, such as, silver acrylate and silver methacrylate which are monomers for a polymer comprising silver.

The term, "antibacterial," as used herein refers to the property of a composition for inhibiting or destroying the growth of bacteria. In other words, a toner particle comprising antibacterial properties is effective in killing bacteria, or in inhibiting growth or propagation of bacteria, including as a printed or fused image.

The term, "antimicrobial," as used herein refers to an agent, or the property imparted by the agent, that kills or inhibits growth of microorganisms or microbes. An antibacterial agent, or property thereof, is an antimicrobial agent. Microorganisms include, for example, bacteria, fungi, algae, other single celled organisms, protists, nematodes, parasites, other multicellular organisms, other pathogens and so on. In other words, a toner particle comprising antimicrobial properties is effective in killing microbes, or in inhibiting growth and propagation of microbes, including as a printed and fused image.

The term, "nano," as used in, "silver nanoparticles," indicates a particle size of less than about 1000 nanometers (nm). In embodiments, the silver nanoparticles have a particle size of from about 0.5 nm to about 1000 nm, from about 1 nm to about 500 nm, from about 1 nm to about 100 nm, from about 1 nm to about 20 nm. The particle size is defined herein as the average diameter of the silver nanoparticles, as determined by TEM (transmission electron microscopy.) In embodiments, the composite nanoparticle has a volume average particle diameter (D50) of from about 10 to about 600 nanometers, or from about 10 to about 300 nanometers, or from about 10 to about 200 nanometers.

A polymer can be identified or named herein by the two or more of the constituent monomers used to construct the polymer, even though following polymerization, a monomer is altered and no longer is identical to the original reactant. Thus, for example, a polyester often is composed of a polyacid monomer or component and a polyalcohol monomer or component. Accordingly, if a trimellitic acid reactant is used to make a polyester polymer, that resulting polyester polymer can be identified herein as a trimellitic polyester. Also, a polymer can be composed of a styrene monomer and an acrylate monomer, and in that case, once polymerized, can be identified based on the monomers used. Hence, if the acrylate is butyl acrylate, the resulting polymer can be called a styrene polymer, a butyl acrylate polymer, a styrene/acrylate polymer and so on.

By, "two dimension," or grammatic forms thereof, such as, 2-D, is meant to relate to a structure or surface that is substantially without measurable or discernible depth, without use of a mechanical measuring device. Generally, the surface is identified as flat, and emphasizes height and width, and lacks the illusion of depth or thickness. Thus, for example, toner is applied to a surface to form an image or coating and generally, that layer of fused toner is from about 1 micrometer (μm) to about 10 μm in thickness. Nevertheless, that application of toner to a flat surface is considered herein as a two dimensional application. The surface can be a sheet or a paper, for example. This definition is not meant to be a mathematic or scientific definition at the molecular level but one which to the eye of the viewer or observer, there is no illusion of thickness. A thicker layer of toner, such as one which might be identified as providing, "raised lettering," on a surface is for the purposes herein, included in the definition of 2-D.

By, "three dimension," or grammatic forms thereof, such, as, 3-D, is meant to relate to a structure composed of plural layers or particle depositions of toner that aggregate or assemble to yield a form, a shape, a construct, an object and the like that, for example, need not be applied to a surface or structure, can be autonomous and/or has a thickness or depth. Printing as used herein includes producing 3-D structures. Printing on a surface or structure also is used herein to include forming a 3-D structure by deposition of plural layers of toner. Often, the first layer is printed on a support, surface, substrate or structure. Successive layers of toner are placed thereon and the already deposited (and optionally adhered or solidified) toner layer or layers is considered herein a surface or a substrate.

Composite Latex.

Polymerization Composite Resin Latex.

In embodiments, provided herein are methods for the polymerization of styrene and acrylate monomers to form a latex comprising a composite styrene/acrylate—metal ion ionomer resin. Ionomers are polymers comprising predominantly neutral monomers with a portion that comprises acidic groups which can be complexed with a metal ion, that is, such a monomer is charged.

In embodiments, the composite ionomer resin is an amorphous polymer. In embodiments, the ionomer is hydrophobic with a small degree of bonded ionic groups. Those ionic interactions produce changes in the physical, mechanical and rheological properties of the ionomer and articles comprising the composite ionomers, such as, inks and toner.

Any metal ion acrylate monomer or methacrylate monomer useful for polymerization of a styrene/acrylate latex resin may be utilized. In embodiments, acrylic or methacrylic monomers may include, but are not limited to, acrylate, methacrylate and so on, wherein the metal ion acrylate monomers are reacted with a styrene/acrylate monomer, optionally a branching agent, optionally a chain transfer agent and optionally an initiator for synthesis of the present composite ionomer resin.

Silver metal ions are known to possess antimicrobial properties and may be referred to as an antimicrobial metal ion. Suitable anti-microbial metals and metal ions include, but are not limited to, those discussed hereinabove, as well as silver, copper, zinc, gold, mercury, tin, lead, iron, cobalt, nickel, manganese, arsenic, antimony, bismuth, barium, cadmium, chromium and thallium. Metal ions of, for example, silver, copper, zinc and gold or combinations thereof are considered safe for human use. Hence, silver ions, alone or in combination with copper or zinc or both, have a high ratio of efficacy to toxicity, i.e., high efficacy to low toxicity.

In embodiments are provided methods for preparing silver acrylate monomers by stoichiometric neutralization of an acrylic acid or methyl acrylic acid with a source of silver ions, such as, a silver salt. For example, an aqueous solution of an acrylic acid is cooled to below room temperature, e.g., about 0° C., and then an aqueous solution of a silver salt is added dropwise forming silver composite monomer. Silver composite monomer may be purified by precipitation and suspended in water and/or a solvent. Silver composite monomer may be dried.

In embodiments, a source of silver ion is selected from silver nitrate, silver sulfonate, silver fluoride, silver tetrafluoroborate, silver oxide, silver acetate or other silver salt. In embodiments, silver nitrate is used as silver ion precursor for synthesis of silver methacrylate or silver acrylate monomers. As used herein, (organic) silver salt can mean salt of monobasic and polybasic carboxylic acids and complexing agents.

Other sources of silver ion are silver salts selected from silver acetylacetonate, silver bromate, silver bromide, silver carbonate, silver chloride, silver citrate, silver iodate, silver iodide, silver lactate, silver nitrite, silver perchlorate, silver phosphate, silver sulfate, silver sulfide and silver trifluoroacetate. Silver salt particles desirably are fine for homogeneous dispersion in a solution, which aids in reaction kinetics.

In embodiments, silver composite monomer is present in an ionomer from about 0.01% to about 10%, from about 0.5% to 5% by weight of an ionomer. In embodiments, total silver present in an ionomer is from about 2,000 to about 20,000 ppm, from about 4,000 to about 15,000 ppm, from about 6,000 to about 13,000 ppm, as measured by inductively coupled plasma mass spectrometry (ICP-MS). In embodiments, total silver present in an ionomer is from about 0.02% to about 2%, from about 0.04% to about 1.5%, from about 0.06% to about 1.3% by weight of an ionomer, as measured by ICP-MS.

Any monomer suitable for preparing a styrene/acrylate latex may be utilized as a co-monomer. Suitable monomers include, but are not limited to, styrenes, acrylates, methacrylates, butadienes, isoprenes, acrylic acids, methacrylic acids, acrylonitriles, combinations thereof and the like. Exemplary co-monomers include, but are not limited to, styrene, alkyl acrylate, such as, methyl acrylate, ethyl acrylate, butyl acrylate, isobutyl acrylate, dodecyl acrylate, n-octyl acrylate, 2-chloroethyl acrylate; β-carboxy ethyl acrylate (β-CEA), phenyl acrylate, methyl α-chloroacrylate, methyl methacrylate (MMA), ethyl methacrylate, butyl methacrylate; butadiene; isoprene; diacrylate, methacrylonitrile; acrylonitrile; vinyl ethers, such as, vinyl methyl ether, vinyl isobutyl ether, vinyl ethyl ether and the like; vinyl esters, such as, vinyl acetate, vinyl propionate, vinyl benzoate and vinyl butyrate; vinyl ketones, such as, vinyl methyl ketone, vinyl hexyl ketone and methyl isopropenyl ketone; vinylidene halides, such as, vinylidene chloride and vinylidene chlorofluoride; N-vinyl indole; N-vinyl pyrrolidone; methacrylate (MA); acrylic acid; methacrylic acid; acrylamide; methacrylamide; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylenes; isobutylene; and the like, and mixtures thereof.

In embodiments, co-monomers for making a composite styrene/acrylate ionomer resin particles include, but are not limited to, cyclohexylmethacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornyl methacrylate, isobornyl acrylate, hexyl acrylate, ethylhexyl acrylate, butyl methacrylacrylate, hexyl methacrylate, ethylhexyl methacrylate, acrylic acid, methacrylic acid, dimethylamino ethyl methacrylate, 2-(dimethylamino) ethyl methacrylate, diethylamino ethyl methacrylate, dimethylamino butyl methacrylate, methylamino ethyl methacrylate and combinations thereof.

Co-monomers may be polymerized, with or without a silver composite monomer, into the following exemplary styrene/acrylate polymers, such as, styrene acrylates, styrene butadienes, styrene methacrylates, and more specifically, poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), poly(styrene-butadiene), poly(styrene-isoprene), poly(styrene-butyl methacrylate), poly(styrene-butyl acrylate-acrylic acid), poly(styrene-butyl methacrylate-acrylic acid), poly(butyl methacrylate-butyl acrylate), poly(butyl methacrylate-acrylic acid), poly(acrylonitrile-butyl acrylate-acrylic acid) and combinations thereof. A polymer may be a block, random or alternating copolymer.

When plural co-monomers are used to make a composite ionomer resin, for example, styrene and alkyl acrylate, a mixture can comprise, for example, styrene, n-butyl acrylate and ADOD (diacrylate). Based on total weight of monomers, styrene may be present in an amount from about 1% to about 99%, from about 50% to about 95%, from about 70% to about 90%, although may be present in greater or lesser amounts; and acrylate(s) may be present in an amount from about 1% to about 99%, from about 5% to about 50%, from about 10% to about 30%, although may be present in greater or lesser amounts. Based on total weight of monomers, a metal ion acrylate monomer may be present in an amount from about 0.01% to about 10%, from about 0.5% to about 5%, from about 0.75% to about 2.5%, although may be present in greater or lesser amounts. In embodiments, based on total weight of monomers, a metal acrylate monomer may be present in an amount from about 0.5% to about 2% in a polymerized composite styrene/acrylate ionomer.

In embodiments, a metal acrylate, such as, a silver acrylate or methacrylate monomer optionally may be copolymerized with a charge control agent, such as, methacrylic acid, β-CEA or methylaminoethyl methacrylate, which monomers can be used to control, for example, the Tg and hydrophobicity of the polymer.

In a polymerization process, reactants are added to a suitable reactor, such as, a mixing vessel. An appropriate amount of starting materials, optionally dissolved in a solvent, is combined with an optional initiator and optional one surfactant to form an emulsion. A polymer may be formed in the emulsion, which then may be recovered and used as a polymer.

In embodiments, a latex for forming composite styrene/acrylate ionomer resin particles may be prepared in an aqueous phase containing a surfactant or co-surfactant, optionally under an inert gas, such as, nitrogen. Surfactants which may be utilized with a resin to form a latex dispersion can be ionic or nonionic surfactants in an amount of from about 0.01 to about 15 weight percent of the solids, or from about 0.1 to about 10 weight percent of solids.

Examples of suitable anionic surfactants include, but are not limited to, sodium dodecylsulfate (SDS), sodium dodecylbenzene sulfonate, sodium dodecylnaphthalenesulfate, dialkyl benzenealkyl sulfates and sulfonates, abitic acid, NEOGEN R® and NEOGEN SC® available from Kao, Tayca Power, available from Tayca Corp., DOWFAX®, available from Dow Chemical Co., CALFAX® DB-45, a C12 (branched) sodium diphenyl oxide disulfonate, available from Pilot Chemical Company and the like, as well as mixtures thereof.

Examples of suitable cationic surfactants include, but are not limited to, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12,C15,C17-trimethyl ammonium bromides, halide salts of quaternized polyoxyethylalkylamines, dodecylbenzyl triethyl ammonium chloride, MIRAPOL® and ALKAQUAT® (available from Alkaril Chemical Company), SANIZOL® (benzalkonium chloride, available from Kao Chemicals), and the like, as well as mixtures thereof.

Examples of suitable nonionic surfactants include, but are not limited to, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol (available from Sanofi as ANTAROX 890®, IGEPAL CA-210®, IGEPAL CA-520®, IGEPAL CA-720®, IGEPAL CO-890®, IGEPAL CO-720®, IGEPAL CO-290®, IGEPAL CA-210® and ANTAROX 897®) and the like, as well as mixtures thereof.

In embodiments, an initiator may be added for forming a latex. In embodiments, initiator is selected from known free radical polymerization initiators. Examples of initiators include water soluble initiators, such as, ammonium persulfate, sodium persulfate and potassium persulfate, and organic soluble initiators including organic peroxides and azo compounds including Vazo peroxides, such as VAZO 64™, 2-methyl 2-2'-azobis propanenitrile, VAZO 88™, 2-2'-azobis isobutyramide dehydrate and combinations thereof. Initiators can be added in amounts from about 0.1 to about 8 weight percent, or from about 0.2 to about 5 weight percent of the monomers.

A chain transfer agent optionally may be used to control the polymerization degree of a latex, and thereby control the molecular weight and molecular weight distribution of product latexes of the latex process and/or an article preparation process according to the present disclosure. As can be appreciated, a chain transfer agent can become part of a latex polymer.

A chain transfer agent can have a carbon-sulfur covalent bond. A C—S covalent bond has an absorption peak in a wave number region ranging from 500 to 800 cm$^{-1}$ in an infrared absorption spectrum. When incorporated into a latex and a toner or ink made from the latex, the absorption peak may be changed, for example, to a wave number region of 400 to 4,000 cm$^{-1}$.

Exemplary chain transfer agents include, but are not limited to, n-$C_{3-15}$ alkylmercaptans; branched alkylmercaptans; aromatic ring-containing mercaptans; and so on. Examples of such chain transfer agents also include, but are not limited to, dodecanethiol (DDT), butanethiol, isooctyl-3-mercaptopropionate, 2-methyl-5-t-butyl-thiophenol, carbon tetrachloride, carbon tetrabromide and the like. The terms, "mercaptan," and, "thiol," may be used interchangeably to mean C—SH group.

Based on total weight of monomers to be polymerized, a chain transfer agent may be present in an amount from about 0.1% to about 7%, from about 0.5% to about 6%, or from about 1.0% to about 5%, although may be present in greater or lesser amounts.

In embodiments, a branching agent optionally may be included in a first/second monomer composition to control branching structure of a latex. Exemplary branching agents include, but are not limited to, decanediol diacrylate (ADOD), trimethylolpropane, pentaerythritol, trimellitic acid, pyromellitic acid and mixtures thereof.

Based on total weight of monomers to be polymerized, a branching agent may be present in an amount from about 0% to about 2%, from about 0.05% to about 1.0%, or from about 0.1% to about 0.8%, although may be present in greater or lesser amounts.

In forming emulsions, starting materials, optional surfactant, optional solvent and optional initiator may be combined utilizing any means within the purview of those skilled in the art. In embodiments, a reaction mixture may be mixed for from about 1 min to about 72 hours, or from about 4 hours to about 24 hours (although times outside those ranges may be utilized), while keeping temperature at from about 10° C. to about 100° C., from about 20° C. to about 90° C., or from about 45° C. to about 75° C., although temperatures outside those ranges may be utilized.

Those skilled in the art will recognize that optimization of reaction conditions, temperature, initiator loading, and so on, can be varied to generate resins of various molecular weight, and structurally related starting materials may be polymerized using comparable techniques.

Once a polymer forms, a resin may be recovered from an emulsion by any technique within the purview of those skilled in the art, including filtration, drying, centrifugation, spray drying and the like, and combinations thereof.

In embodiments are provided methods for preparing a latex comprised of composite styrene/acrylate—metal ionomer resin particles, wherein the resin particles are synthesized in an emulsion polymerization reaction. In embodiments, a surfactant solution is prepared, heated and purged with nitrogen. Once thermal equilibrium is reached, an emulsion of monomers, including a metal acrylate monomer, styrene/acrylate co-monomers, an optional chain transfer monomer and an optional branching monomer is added slowly, such as, dropwise, to the heated surfactant solution. An aqueous solution of initiator, such as, ammonium or potassium persulfate, may be added slowly to the reactor. Following addition of all reactants, the emulsion is mixed and heat maintained for about 6 to about 24 hours. Following completion of the polymerization reaction, the emulsion is cooled and the resin particles separated, such as, filtered or sieved, such as, with a 25 mm screen.

In embodiments, the composite styrene/acrylate resin particle can have a diameter size from about 50 nm to about 300 nm, from about 75 nm to about 150 nm, or from about 80 nm to about 130 nm, as measured by, for example, dynamic light scattering, as known in the art. A composite styrene/acrylate resin particle can have a molecular weight from about 10,000 (10 k) to about 500 k, from about 15 k to about 250 k, from about 20 k to about 200 k. Higher molecular weight of composite resin particles indicates chain entanglements due to ionic interactions that may contribute to physical crosslinking of polymer chains. Particle size, such as, diameter, may be a function of time, in other words, length of polymerization reaction, however, the ratio of composite monomers to styrene/acrylate monomers and the degree of chain entanglements, also may influence composite styrene/acrylate resin/metal particle diameter size.

As used herein, reference to, "particle size," generally refers to D50 mass median diameter (MMD) or log-normal distribution mass median diameter. MMD is considered to be average particle diameter by mass.

Semiconductive electrical properties of the present silver ionomers were analyzed wherein ζ potential was measured. As understood in the art, ζ potential is a measure of magnitude of electrostatic or charge repulsion/attraction between particles and is a fundamental parameter known to impact stability. In other words, ζ potential, also referred to as electrokinetic potential, is an indirect measure or indicator of stability of ionomer particle dispersion. For example, ζ potential measurement may bring detailed insight into causes of dispersion, aggregation or flocculation, and can be used to improve formulation of dispersions, emulsions and suspensions. ζ potential reflects a potential difference between dispersion medium and stationary layer of fluid attached to dispersed particles.

Magnitude of ζ potential indicates the degree of electrostatic repulsion between adjacent, similarly charged particles in a dispersion. For molecules and particles that are small enough, a high ζ potential relates to stability, generally, a value of at least about −55, at least about −65 or lower (greater absolute value) is desirable. As seen in Table 1, a silver composite ionomer of Example 1 had a measured ζ potential of −65.5 mV, which indicates stability of the composite ionomer particle dispersion.

In embodiments, the emulsion polymerization composite resin latex, can be used to prepare resin nanoparticles wherein the core comprises at least one styrene/acrylate polymer resin and a shell comprises at least one composite styrene/acrylate—metal ion polymer resin.

Nanoparticle Composite Latex.

Embodiments herein provide methods of synthesizing composite nanoparticles, wherein metal ions, such as, silver ions, are immobilized in a shell (optionally, also in a core) of a core-shell resin particle. Placement of a metal composite ionomer in a shell provides accessibility of silver ions for applications, such as, an antimicrobial or as a sensor. Materials made from composite nanoparticles include, but are not limited to, aqueous inks, dry inks, toner, additive composites, composites for 3-dimensional printers, gravure printing ink, paints etc.

In embodiments, a core may comprise any styrene/acrylate polymer resin useful for forming nanoparticles, such as, binder resins. Polymers may be synthesized using any of the styrene/acrylate monomers and/or co-monomers mentioned above or known in the art, and optionally including a metal ion, by using known conventional methods in the art for forming resin polymers, including bulk polymerization, solution polymerization and emulsion polymerization; there are no intended limitations on the method of synthesizing polymers.

In embodiments, the composite nanoparticle core resin is selected from the group consisting of styrene acrylates, styrene butadienes, styrene methacrylates, and combinations thereof. In embodiments, are provided core resin particles wherein the polymers are selected from poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), poly(styrene-butadiene), poly(styrene-isoprene), poly(styrene-butyl methacrylate), poly(styrene-butyl acrylate-acrylic acid), poly(styrene-butyl methacrylate-acrylic acid), poly(butyl methacrylate-butyl acrylate), poly(butyl methacrylate-acrylic acid), poly(acrylonitrile-butyl acrylate-acrylic acid) and combinations thereof.

In embodiments, a core is prepared via a polymerization reaction, wherein monomers are selected from styrene, alkyl acrylate, such as, methyl acrylate, ethyl acrylate, butyl acrylate, isobutyl acrylate, dodecyl acrylate, n-octyl acrylate, 2-chloroethyl acrylate; β-CEA, phenyl acrylate, methyl α-chloroacrylate, MMA, ethyl methacrylate and butyl methacrylate; butadiene; isoprene; methacrylonitrile; acrylonitrile; vinyl ethers, such as, vinyl methyl ether, vinyl isobutyl ether, vinyl ethyl ether and the like; vinyl esters, such as, vinyl acetate, vinyl propionate, vinyl benzoate and vinyl butyrate; vinyl ketones, such as, vinyl methyl ketone, vinyl hexyl ketone and methyl isopropenyl ketone; vinylidene halides, such as, vinylidene chloride and vinylidene chlorofluoride; N-vinyl indole; N-vinyl pyrrolidone; MA; acrylic acid; methacrylic acid; acrylamide; methacrylamide; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylenes; isobutylene; and the like, and mixtures thereof.

In embodiments, a core particle optionally further comprises styrene/acrylate latex copolymers. Illustrative examples of a styrene/acrylate latex copolymer includes poly(styrene-n-butyl acrylate-β-CEA), poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), poly(styrene-butyl acrylate-acrylonitrile) and the like.

In embodiments, a metal acrylate is included in an emulsion. An example of a metal acrylate is a silver acrylate, such as, a silver methacrylate.

In embodiments, a core styrene/acrylate polymer resin optionally further comprises any of the above mentioned chain transfer agents and/or branching agents, including in the above mentioned amounts. A core styrene/acrylate polymer comprises a styrene monomer, an acrylate monomer, optionally a chain transfer agent and optionally a branching agent.

In embodiments are provided methods for preparing a latex comprised of composite nanoparticles. A core styrene/acrylate resin particles may be synthesized in an emulsion polymerization reaction, followed by polymerization of shell monomers on the surface of core particles. In alternative embodiments, a shell resin is formed and then added to the core particle emulsion to form a layer encapsulating the core particles.

In embodiments, a surfactant solution may be prepared, such as, with an anionic surfactant and water, heated and purged with nitrogen. Once thermal equilibrium is reached, an emulsion (optionally including a surfactant) of the core monomers, including styrene/acrylate monomers (e.g. styrene and butyl-acrylate), an optional chain transfer monomer and an optional branching monomer may be added slowly, such as drop wise, to the heated aqueous surfactant solution. An aqueous solution of initiator, such as ammonium or potassium persulfate, may be slowly added to the reactor to form the core resin polymers.

Following formation of the core latex, an emulsion of shell monomers may be prepared and added to the emulsion of core particles wherein a shell comprising composite styrene/acrylate—metal ion polymer resin can be formed covering a part of or encapsulating, that is, covering the whole or entirety of the surface of core particles. In forming a shell emulsion, shell monomers, e.g. silver (meth)acrylate and methyl methacrylate, optional chain transfer monomer, optional chain branching monomers may be added to an aqueous solution optionally comprising a surfactant. A shell emulsion may be added to the reactor containing optionally heated core particle latex, which forms, "surface seeds," on core resin particles. To complete polymerization of the shell resin, an aqueous solution of initiator, such as ammonium or potassium persulfate, may be slowly added to the reactor. Following addition of all reactants, the emulsion may be mixed and the heat maintained for an extended period of time, such as, from about 6 to about 24 hours. Following completion of the polymerization reaction, the emulsion can be cooled and the resin particles may be filtered or sieved, such as with a 25 millimeter screen.

In embodiments, shell monomers comprise at least one metal acrylate monomer described above and a styrene/acrylate monomer, also described above. In embodiments, a shell comprises a polymer comprising a metal methacrylate and/or metal acrylate, such as, silver acrylate or silver methacrylate.

In embodiments, composite nanoparticles can be from about 10 to about 200 nm in size, from about 25 to about 150 nm, or from about 50 to about 100 nm in size. Composite nanoparticles may be smaller in size, as measured by, for example, dynamic light scattering, than composite resin particles. That may be due to polymerization in situ of a shell resin, instead of forming a shell resin and then adding to core particles. Polymerization of a composite ionomer resin may result in entanglement of ionic polymer chains, as measured by molecular weight, wherein particles have a larger diameter than those of the composite nanoparticles. Furthermore, interaction between ionic metal of a composite resin and carboxyl groups acts as ionic crosslinks that may have an effect on properties of a composite ionomer and nanoparticles comprising those composite ionomers, such as, solubility in chemical solvents, Tg, molecular weight and water sensitivity.

Self-Dispersed Polymeric Metal Composite.

The anti-bacterial aqueous ink compositions herein contain a self-dispersed polymeric metal composite. The polymeric metal composite is prepared via an environmentally friendly method; that is, by green chemistry.

In embodiments, the polymeric metal composite comprises a silver-acrylate or methacrylate. The silver acrylate or silver methacrylate complex can be simultaneously synthesized during the self-assembly or dispersing of polymer in water at 90° C. The polymer serves as both a carrier for the Ag ions and an organic matrix for the in situ synthesis of silver nanocomposites. A mild reducing agent can optionally be added during the self-assembly of the polymeric metal composite to reduce silver nitrate into silver nanoparticles (AgNPs) resulting in well dispersed particles. The polymer backbone plays an important role in inhibiting the agglomeration of AgNPs. This is the latex or binding functional component used in the aqueous ink formulation herein which provides the anti-bacterial/anti-microbial properties to the ink. Advantageously, no organic solvents are used in the process, the process is clean and simple, and no purification or work-up is needed.

The anti-bacterial aqueous ink compositions herein comprise self-dispersed polymer-silver nanoparticle composites. In embodiments, the composites are prepared by synthesizing silver nanoparticles (AgNPs) by reduction of silver (I) ion simultaneously during the self-assembly of acrylate or methacrylate resin particles in water. The methods which employ water as the bulk solvent are environmentally friendly being free of organic solvents. The methods are efficient requiring minimal time to prepare the polymer metal nanocomposites. Without being bound by theory, it is postulated that silver ions are trapped within the polymer backbone during the polymerization of the acrylate/methacrylate/other monomer while simultaneously being reduced to AgNPs. The silver composite complexes are simultaneously synthesized during the self-assembly or dispersing of polymer in water. Thus, the polymer serves as both a carrier for the silver ions and an organic matrix for the in situ synthesis of silver nanocomposites. The reducing agent is added during the self-assembly of polymer to reduce silver nitrate into silver nanoparticles (AgNPs) resulting in well dispersed particles. The polymer backbone plays an important role as it is postulated to inhibit the agglomeration of AgNPs. The reducing agent employed in the reduction of silver ion also freely diffuses throughout the polyester matrix and promotes the formation of well-dispersed AgNPs on the surface and interior of the polymer. Advantageously, the process minimizes nanoparticle agglomeration that plagues conventional methods with pre-formed nanoparticles. The polymer has an important role in keeping the AgNPs dispersed as well as maintaining overall chemical and mechanical stability of the composite.

In embodiments, self-association, self-assembly, self-dispersible nanoparticles in aqueous medium yield micelle-like aggregates. The formation of silver nanoparticles within and surrounding the micelles is a secondary occurrence upon addition of silver nitrate and reducing agent.

In embodiments, the ink composition comprises a self-dispersible acrylate-Ag or methacrylate-Ag nanocomposite where the Ag is present in a concentration of from about 0.5 ppm to about 5,000 ppm, in specific embodiments, in a concentration of from about 50 to about 500 ppm.

Anti-Bacterial Aqueous Ink Compositions.

In embodiments, ionic-polymer metal nanocomposites are incorporated into ink compositions for anti-bacterial applications. The ink compositions enable customizable, digitized anti-bacterial printing. Examples of applications include, but are not limited to, printing codes, labels, and logos on medical devices including catheters, thermometers, and other medical devices, printing on menus, food packaging materials, cosmetic tools and products, and any application where one desires a hygienic surface.

The ink herein is particularly useful for indirect printing applications wherein the ink wets the intermediate receiving member enabling formation of a transient image on the intermediate receiving member while undergoing a stimulus induced property change which enables release from the intermediate receiving member in the transfer printing step. In embodiments, the ink undergoes partial or complete drying while on the intermediate transfer member.

Ink compositions herein are specifically suitable for indirect printing systems, are compatible with different printing subsystems including jetting and transfer subsystems, and enable high quality printing at high speed. In embodiments, ink compositions herein enable and perform well in both wetting and transfer subsystems, displaying both acceptable wettability characteristics in combination with acceptable release and transfer characteristics.

Optional Co-Solvent.

The ink compositions herein can consist solely of water, or can comprise a mixture of water and a water soluble or water miscible component, referred to as a co-solvent, humectant, or the like (hereinafter co-solvent) such as alcohols and alcohol derivatives, including aliphatic alcohols, aromatic alcohols, dials, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof. In embodiments, the co-solvent is selected from the group consisting of ethylene glycol, N-methylpyrrolidone, methoxylated glycerol, ethoxylated glycerol, and mixtures thereof.

When mixtures of water and water soluble or miscible organic solvent liquids are selected as the liquid vehicle, the water to organic co-solvent ratio ranges can be any suitable or desired ratio, in embodiments from about 100:0 to about 30:70, or from about 97:3 to about 40:60, or from about 95:5 to about 60:40. The non-water component of the liquid vehicle generally serves as a humectant or co-solvent which has a boiling point higher than that of water (100° C.). The co-solvent selected is one that will mix with water without phase separation; thus, a co-solvent having a polarity that is compatible with water is selected. The organic component of the ink vehicle can also serve to modify ink surface tension, modify ink viscosity, dissolve or disperse the colorant, and/or affect the drying characteristics of the ink. In embodiments, the ink is more attracted to paper substrates than plastic media as in solvent-based inks.

The water soluble or water miscible organics which are used in the ink formulation can help with surface tension, drying, leveling, etc. In embodiments, water makes up over 50% of the formulation, in embodiments water comprises from about 60 to about 70% of the ink composition. Thus, the ink compositions herein are mainly aqueous.

In certain embodiments, the co-solvent is selected from the group consisting of sulfolane, methyl ethyl ketone, isopropanol, 2-pyrrolidinone, polyethylene glycol, and mixtures thereof.

The total amount of liquid vehicle can be provided in any suitable or desired amount. In embodiments, the liquid vehicle is present in the ink composition in an amount of from about 75 to about 97 percent, or from about 80 to about 95 percent, or from about 85 to about 95 percent, by weight, based on the total weight of the ink composition.

Colorants.

The ink composition herein may also contain a colorant. Any suitable or desired colorant can be used in embodiments herein, including pigments, dyes, dye dispersions, pigments dispersions, and mixtures and combinations thereof.

The colorant may be provided in the form of a colorant dispersion. In embodiments, the colorant dispersion has an average particle size of from about 20 to about 500 nanometers (nm), or from about 20 to about 400 nm, or from about 30 to about 300 nm. In embodiments, the colorant is selected from the group consisting of dyes, pigments, and combinations thereof, and optionally, the colorant is a dispersion comprising a colorant, an optional surfactant, and an optional dispersant.

As noted, any suitable or desired colorant can be selected in embodiments herein. The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Reactive Dyes, such as Reactive Red Dyes (No. 4, 31, 56, 180, and the like), Reactive Black dyes (No. 31 and the like), Reactive Yellow dyes (No. 37 and the like); anthraquinone dyes, monoazo dyes, disazo dyes, phthalocyanine derivatives, including various phthalocyanine sulfonate salts, aza(18)annulenes, formazan copper complexes, triphenodioxazines, and the like; as well as mixtures thereof.

Examples of suitable pigments include black pigments, white pigments, cyan pigments, magenta pigments, yellow pigments, and the like. Further, pigments can be organic or inorganic particles. Suitable inorganic pigments include carbon black. However, other inorganic pigments may be suitable such as titanium oxide, cobalt blue ($CoO$—$Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW18, FW 5160, FW 5170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle and to prevent clogging of the ink channels when the ink is used in a thermal ink jet printer or a piezoelectric ink jet printer.

The colorant can be present in the ink composition in any desired or effective amount, in embodiments, the colorant can be present in an amount of from about 0.05 to about 15 percent, or from about 0.1 to about 10 percent, or from about 1 to about 5 percent by weight, based on the total weight of the ink composition.

Surfactants.

The inks disclosed may also contain a surfactant. Examples of suitable surfactants include ionic surfactants, anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethyl ammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™ IGEPAL CA-520™, IGEPAL CA-720™, IGEPAL CO-890™, IGEPAL CO-720™, IGEPAL C0-290™, IGEPAL CA-210™, ANTAROX 890™, and ANTAROX 897™. Other examples of suitable nonionic surfactants include a block copolymer of polyethylene oxide and polypropylene oxide, including those commercially available as SYNPERONIC™ PE/F, such as SYNPERONIC™ PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Sigma-Aldrich, NEOGEN R™, NEOGEN SC™ available from Daiichi Kogyo Seiyaku, combinations thereof, and the like. Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used.

The optional surfactant can be present in any desired or effective amount, in embodiments, the surfactant is present in an amount of from about 0.01 to about 5 percent by weight, based on the total weight of the ink composition. It should be noted that the surfactants are named as dispersants in some cases.

Crosslinkers.

The ink composition can further comprise crosslinkers. In embodiments, the crosslinker is an organoamine, a dihydroxy aromatic compound, isocyanate, a peroxide, a metal oxide, or the like, as well as mixtures thereof. Crosslinking can further enhance the physical properties of the images generated from the ink composition. The crosslinker can be present in any desired or effective amount, in embodiments from about 0.1 to about 20 percent, or from 5 to about 15 percent, by weight, based on the total weight of the ink composition.

Additives.

The ink composition can further comprise additives. Optional additives that can be included in the ink compositions include biocides, fungicides, pH controlling agents such as acids or bases, phosphate salts, carboxylates salts, sulfite salts, amine salts, buffer solutions, and the like, sequestering agents such as EDTA (ethylenediamine tetra acetic acid), viscosity modifiers, leveling agents, and the like, as well as mixtures thereof.

In embodiments, the ink composition is a low-viscosity composition. The term "low-viscosity" is used in contrast to conventional high-viscosity inks such as screen printing inks, which tend to have a viscosity of at least 1,000 centipoise (cps). In specific embodiments, the ink disclosed herein has a viscosity of no more than about 100 cps, no more than about 50 cps, or no more than about 20 cps, or from about 2 to about 30 cps at a temperature of about 30° C., although the viscosity can be outside of these ranges. When used in ink jet printing applications, the ink compositions are generally of a viscosity suitable for use in said ink jet printing processes. For example, for thermal ink jet printing applications, at room temperature (i.e., about 25° C.), the ink viscosity is at least about 1 centipoise, no more than about 10 centipoise, no more than about 7 centipoise, or no more than about 5 centipoise, although the viscosity can be outside of these ranges. For piezoelectric ink jet printing, at the jetting temperature, the ink viscosity is at least about 2 centipoise, at least about 3 centipoise, no more than about 20 centipoise, no more than about 15 centipoise, or no more than about 10 centipoise, although the viscosity can be outside of these ranges. The jetting temperature can be as low as about 20 to 25° C., and can be as high as about 70° C., as high as about 50° C., or as high as about 40° C., although the jetting temperature can be outside of these ranges.

In certain embodiments, the ink compositions herein have a viscosity of from about 2 to about 20 centipoise at a temperature of about 30° C.

The ink compositions herein have selected surface tension characteristics that provide wetting and release properties suitable for indirect printing applications. In embodiments, the ink composition is selected to provide a surface tension, viscosity, and particle size that is suitable for use in a piezoelectric ink jet print head.

In embodiments, the ink composition herein has a surface tension of from about 15 to about 50 dynes per centimeter, or from about 18 to about 38 dynes per centime, or from about 20 to about 35 dynes per centimeter, although the surface tension can be outside of these ranges.

The ink compositions can be prepared by any suitable process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in embodiments from about 5 to about 10 minutes. Alternatively, the optional ink additives can be mixed with the other ink ingredients during the ink preparation process, which takes place according to any desired procedure, such as by mixing all the ingredients, heating if desired, and filtering.

In a specific embodiment, the inks are prepared as follows: 1) preparation of an ionic polymer-metal nanoparticle composite; 2) preparation of a dispersion of a colorant optionally stabilized with a surfactant; 3) mixing of the composite with the colorant dispersion; 4) optional filtering of the mixture; 5) addition of other components such as water, optional co-solvents, and optional additives; and 6) optional filtering of the composition.

Also disclosed herein is a process which comprises applying an ink composition as disclosed herein to a substrate in an imagewise pattern. Also disclosed herein is a process which comprises applying an ink composition as disclosed herein to a substrate as an over coat, wherein the over coat can be clear, colored, or a combination thereof. In embodiments, the ink composition comprises a clear overcoat.

The ink compositions can be used in a process which entails incorporating the ink composition into an ink jet printing apparatus and causing droplets of the ink to be ejected in an imagewise pattern onto a substrate. In a specific embodiment, the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. In yet another embodiment, the printing apparatus employs a piezoelectric ink jet process, wherein droplets of the ink are caused to be ejected in imagewise pattern by oscillations of piezoelectric vibrating elements. Any suitable substrate can be employed.

In a specific embodiment, a process herein comprises incorporating an ink prepared as disclosed herein into an ink jet printing apparatus, ejecting ink droplets in an imagewise pattern onto an intermediate transfer member, heating the image to partially or completely remove solvents, and transferring the ink in the imagewise pattern from the intermediate transfer member to a final recording substrate. In a specific embodiment, the intermediate transfer member is heated to a temperature above that of the final recording sheet and below that of the ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

Any suitable substrate or recording sheet can be employed as the final recording sheet, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like. In embodiments, the substrate comprises a three-dimensional substrate. In embodiments, the substrate comprises medical devices such as catheters, thermometers, cardiac stents, programmable pace makers, other medical devices, menus, food packaging materials, cosmetic tools and products, and any other desired three-dimensional substrate. In further embodiments, the substrate comprises customizable digitally printed ID codes, short-run printable materials three-dimensional medical and any other desired three-dimensional substrate.

In embodiments, the ink composition, when printed, provides anti-bacterial and antifungal properties to the substrate.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

TABLE 2

| | Component | Example 1 (grams) | Example 2 (grams) |
|---|---|---|---|
| Initial Solution | SLS | 2.52 | 1.89 |
| | dH$_2$O | 81.2 | 85.5 |
| Core Monomer | Styrene | 41.0 | 71.75 |
| | n-butyl acrylate | 51.25 | 20.50 |
| | DDT | 2.38 | 2.38 |
| | dH$_2$O | 43.53 | 44.19 |
| | SLS | 5.87 | 4.40 |
| Shell Monomer | Ag Methacrylate | 1.00 | 1.00 |
| | Methyl Methacrylate | 9.23 | 9.23 |
| | DDT | 0.42 | 0.42 |
| | dH$_2$O | 10.0 | 10.0 |
| | SLS | 1.0 | 1.0 |

SLS = sodium lauryl sulfate
dH$_2$O = deionized water
DDT = 1-dodecanethiol

Examples 1 and 2

Preparation of styrene/N-butyl acrylate core silver/methyl methacrylate shell latex using SLS. For the initial solution, sodium lauryl sulfate (SLS) was dissolved in deionized water (dH$_2$O) in a three-necked round-bottom flask equipped with a reflux condenser, overhead stirrer and nitrogen exit and heated to 70° C. (200 RPM). The core monomer mixture was prepared by adding styrene, N-butyl acrylate and 1-dodecanethiol (DDT) to a beaker. SLS was dissolved in dH2O and added to the core monomer mixture. The monomer was emulsified with rapid mechanical stirring for 5 minutes followed by rest for 5 minutes, repeated twice for a total of three times. 7.71 grams of the core monomer mixture for Example 1 and 4.61 grams of the core monomer mixture for Example 2 was added to the reactor as a seed. The initiator was prepared by dissolving 1.38 grams potassium persulfate (also known as potassium peroxydisulfate, KPS), and 0.74 grams sodium bicarbonate in 13.0 grams dH$_2$O and added to the reactor dropwise. The remaining core monomer emulsion was fed into the reactor by pump at a rate of 0.7 grams/minute. The shell monomer mixture was prepared by dissolving silver (Ag) methacrylate in methyl methacrylate and adding DDT. SLS was dissolved in H$_2$O and added to the shell monomer mixture. The shell monomer was emulsified with rapid mechanical stirring for 5 minutes followed by rest for 5 minutes, repeated twice for a total of three times. 2.17 grams of the shell monomer mixture for Example 1 and 1.00 gram of the shell monomer mixture for Example 2 was added to the reactor as a seed. The initiator was prepared by dissolving 0.35 gram KPS and 0.184 grams sodium bicarbonate in 3.3 grams dH$_2$O and added to the reactor dropwise. The remaining shell monomer emulsion was added to the reactor dropwise (240 RPM). The reaction was allowed to proceed at 70° C. overnight (200 RPM) before the latex was cooled to room temperature and sieved through a 25 micrometer (μm) sieve. The final appearance of both Example 1 and Example 2 latexes was a dark grey opaque emulsion.

TABLE 3

| Measurement | Example 1 | Example 2 |
|---|---|---|
| Solids Content (%) | 29.49 | 22.01 |
| D50 Particle Size (Nanometers) | 42.1 | 43.9 |
| Zeta potential (mV) | −82.4 | −63.6 |
| Zeta deviation (mV) | 10.5 | 12.8 |
| Silver content by ICP (ppm) | 204.2 | 310.2 |
| Tg (onset) | 93.47° C. | 43.26° C. |
| Molecular Weight | 20,378 | 14,989 |

Aqueous ink Examples 3 and 4 were preparing using the silver methacrylate latexes of Examples 1 and 2, respectively. Table 4 provides ink components for aqueous ink Example 3. Table 5 provides ink components for aqueous ink Example 4.

TABLE 4

| Component | Solids Weight Percent | Percent Solids | Weight Percent | Solids Added (grams) | Total Added (grams) |
|---|---|---|---|---|---|
| Example 1 Latex | 31.47 | 29.49 | 23.04 | 15.11 | 51.24 |
| Diethylene Glycol | 18.08 | 100 | 3.90 | 8.68 | 8.68 |
| 1,5-Pentanediol | 24.11 | 100 | 5.21 | 11.58 | 11.58 |
| Glycerol | 16.89 | 100 | 3.65 | 8.11 | 8.11 |
| 2-ethyl-1-hexanol | 5.06 | 100 | 1.09 | 2.43 | 2.43 |
| PEO | 1.02 | 100 | 0.22 | 0.49 | 0.49 |
| Triethanolamine | 1.69 | 100 | 0.36 | 0.81 | 0.81 |
| A-008 | 0.50 | 10 | 0.11 | 0.24 | 0.24 |
| S-761p (34 Active) | 0.15 | 100 | 0.03 | 0.07 | 0.07 |
| 104H | 1.04 | 100 | 0.22 | 0.5 | 0.5 |
| Water | 0 | 0 | 62.15 | 0 | 138.2 |
| Total | 100 | | 100 | 48.02 | 222.35 |
| Theoretical Percent Solids | 21.60 | | | | |

TABLE 5

| Component | Solids Weight Percent | Percent Solids | Weight Percent | Solids Added (grams) | Total Added (grams) |
|---|---|---|---|---|---|
| Example 2 Latex | 31.47 | 22.01 | 30.88 | 15.11 | 68.65 |
| Diethylene Glycol | 18.08 | 100 | 3.90 | 8.68 | 8.68 |
| 1,5-Pentanediol | 24.11 | 100 | 5.21 | 11.58 | 11.58 |
| Glycerol | 16.89 | 100 | 3.65 | 8.11 | 8.11 |
| 2-ethyl-1-hexanol | 5.06 | 100 | 1.09 | 2.43 | 2.43 |
| PEO | 1.02 | 100 | 0.22 | 0.49 | 0.49 |
| Triethanolamine | 1.69 | 100 | 0.36 | 0.81 | 0.81 |
| A-008 | 0.50 | 10 | 0.11 | 0.24 | 0.24 |
| S-761p (34 Active) | 0.15 | 100 | 0.03 | 0.07 | 0.07 |
| 104H | 1.04 | 100 | 0.22 | 0.5 | 0.5 |
| Water | 0 | 0 | 54.32 | 0 | 120.79 |
| Total | 100 | | 100 | 48.02 | 222.35 |
| Theoretical Percent Solids | 21.60 | | | | |

PEO = polyethylene oxide, MW 20 KDa.
A-008 = Silsurf ®A008, a very low molecular weight ethoxylated polydimethylsiloxane (Silicone Polyether).
S-761p = Chemguard S-761P, a short-chain perfluoro-based anionic fluorosurfactant of the phosphate ester type.
104H = Surfynol ® 104 Surfactant by Air Products (2,4,7,9-tetramethyl-5-decyne-4,7-diol; a nonionic surfactant that has multifunctional benefits, including wetting and foam control, in aqueous systems. 75% active liquid in Ethylene Glycol).

Example 3

Aqueous Ink Example 3 containing the Latex of Example 1 having the components as set forth in Table 4 was prepared as follows. Latex, water and triethanolamine were added to a 250 milliliter amber glass bottle followed by stirring for 2 minutes at 300 RPM. Diethylene glycol, 1,5-pentanediol and glycerol were added and the mixture was stirred for 1 minute at 500 RPM. Next 2-ethyl-1-hexanol and polyethylene oxide (PEO, MW=20 kDa) were added and the mixture was further stirred for an additional 1 minute at 500 RPM. The surfactants A-008, 104H and S761p (34% active solids) were added to the ink and the mixture was stirred for 45 minutes at 500 RPM. The ink was then homogenized for 5 minutes at 3000 RPM and filtered through a 0.45 micron filter before testing.

Example 4

Aqueous Ink Example 4 containing the Latex of Example 2 having the components as set forth in Table 5 was prepared as described in aqueous ink Example 3.

To test their antibacterial properties the aqueous inks of Examples 3 and 4 were used to dip-coat different substrates (VWR410 qualitative filter paper and Whatman 6 qualitative filter paper), allowed to dry and placed onto an inoculated petri dish containing general purpose powdered medium for the cultivation of less fastidious microorganisms (nutrient agar; N0394 FLUKA). The dish was incubated overnight at 37° C.

FIG. 1 shows the silver methacrylate latex-containing aqueous ink of Example 3 (top) and the silver methacrylate latex-containing aqueous ink of Example 4 (bottom) on VWR410 filter paper (left) and Whatman 6 filter paper (right). As shown in FIG. 1, after 24 hours of growth large zones of inhibition were observed for both inks on both substrates. It was surprisingly found that the ionic bond did not stop the silver from being anti-bacterial.

Thus, in embodiments, aqueous ink jet material was formulated as a clear ink jet overcoat or optionally a colored ink jet image providing anti-bacterial and anti-fungal protection on various substrates. The organic/inorganic hybrid particles used to formulate the ink provides characteristics related to coating performance (robustness) and thermal stability due to the "inorganic" characteristics imparted by the ionic silver. The latex composite contains the non-halide silver salt or silver complex. This configuration aids in stabilization, enables controlled release of silver ions while the polymer backbone prevents silver ions from aggregation, and provides a large active area of silver ions which can be strategically spread out within the backbone. In embodiments, the ink composition comprises a self-dispersible polyester-Ag nanocomposite where the Ag is present in a concentration of from about 0.5 ppm to about 5,000 ppm, in specific embodiments, in a concentration of from about 50 to about 500 ppm. In embodiments, the ink compositions herein enable customizable digitally printed identification (ID) codes, short-run printable materials, printing on 3D medical components such as catheters, cardiac stents and programmable pacemakers.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. An aqueous ink composition comprising:
water;
an optional co-solvent;
an optional colorant; and
a composite nanoparticle comprising a core and a shell;
wherein the core comprises a polymer core resin, optionally comprising a metal; and
wherein the shell comprises a metal ion polymer resin.

2. The aqueous ink composition of claim 1, wherein the composite nanoparticle core resin is selected from the group consisting of styrene, acrylates, styrene butadienes, styrene methacrylates and combinations thereof.

3. The aqueous ink composition of claim 1, wherein the composite nanoparticle core resin is selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), poly(styrene-butadiene), poly(styrene-isoprene), poly(styrene-butyl methacrylate), poly(styrene-butyl acrylate-acrylic acid), poly(styrene-butyl methacrylate-acrylic acid), poly(butyl methacrylate-butyl acrylate), poly(butyl methacrylate-acrylic acid), poly(acrylonitrile-butyl acrylate-acrylic acid), and combinations thereof.

4. The aqueous ink composition of claim 1, wherein the composite nanoparticle shell comprises a silver ionomer resin.

5. The aqueous ink composition of claim 1, wherein the optional core metal, if present, is selected from the group consisting of silver, cobalt, copper, nickel, gold, palladium, and combinations thereof; and
wherein the shell metal of the shell metal ion polymer resin is selected from the group consisting of silver, cobalt, copper, nickel, gold, palladium, and combinations thereof.

6. The aqueous ink composition of claim 1, wherein the optional core metal, if present, is silver; and
wherein the shell metal of the shell metal ion polymer resin is silver.

7. The aqueous ink composition of claim 1, wherein the shell metal ion polymer resin comprises a silver composite monomer selected from the group consisting of a silver acrylate monomer, a silver methacrylate monomer, and combinations thereof.

8. The aqueous ink composition of claim 1, wherein the composite nanoparticle comprises an acrylate-silver or methacrylate-silver nanocomposite where the silver is present in a concentration of from about 0.5 ppm to about 5,000 ppm.

9. The aqueous ink composition of claim 1, wherein the composite nanoparticle shell metal ion polymer resin comprises a co-monomer selected from the group consisting of methyl methacrylate, butyl acrylate, diacrylate, cyclohexyl methacrylate, styrene, methacrylic acid, dimethylaminoethyl methacrylate, and combinations thereof.

10. The aqueous ink composition of claim 1, wherein the composite nanoparticle has a volume average particle diameter of from about 10 to about 600 nanometers.

11. The aqueous ink composition of claim 1, wherein the optional metal of the polymer core resin is present, and wherein the core resin comprises a silver composite monomer selected from the group consisting of a silver acrylate monomer, a silver methacrylate monomer, and combinations thereof.

12. The aqueous ink composition of claim 1, wherein the optional core metal, if present, and the shell metal comprise a composite comprising silver and one or more other metals;
wherein the optional core metal, if present, and the shell metal comprise a composite comprising silver and one or more non-metals; or
wherein the optional core metal, if present, and the shell metal comprise a composite comprising silver, one or more other metals, and one or more non-metals.

13. The aqueous ink composition of claim 1, wherein the colorant is present and wherein the colorant is selected from the group consisting of dyes, pigments, and combinations thereof, and optionally, the colorant is a dispersion comprising a colorant, an optional surfactant, and an optional dispersant.

14. The aqueous ink composition of claim 1, wherein the ink composition comprises a clear overcoat.

15. The aqueous ink composition of claim 1, wherein the ink composition, when printed, provides anti-bacterial and antifungal properties to the substrate.

16. The aqueous ink composition of claim 1, wherein the composite nanoparticle acts as a reservoir for the delivery of silver ions for anti-bacterial, antifungal, and antiviral biocide effect.

17. A process comprising:
incorporating an aqueous ink comprising water; an optional co-solvent; an optional colorant; and a composite nanoparticle comprising a core and a shell; wherein the core comprises a polymer core resin, optionally comprising a metal; and wherein the shell comprises a metal ion polymer resin, into an ink jet printing apparatus;
ejecting droplets of ink in an imagewise pattern onto an intermediate transfer member or directly onto a final image receiving substrate;
optionally, heating the image to partially or completely remove solvents; and
optionally, when an intermediate transfer member is used, transferring the ink in the imagewise pattern from the intermediate transfer member to a final recording substrate.

18. The process of claim 17, wherein the substrate comprises a three-dimensional substrate.

19. The process of claim 17, wherein the composite acts as a reservoir for the delivery of silver ions for anti-bacterial, antifungal, and antiviral biocide effect.

* * * * *